G. BURGESS.
SIGNAL FOR AUTOMOBILES.
APPLICATION FILED SEPT. 28, 1914.
1,134,104.
Patented Apr. 6, 1915.
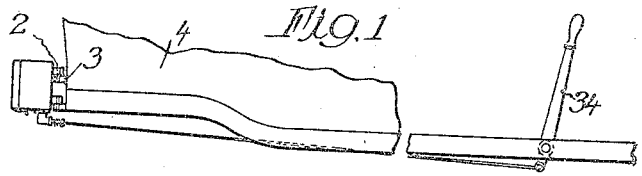
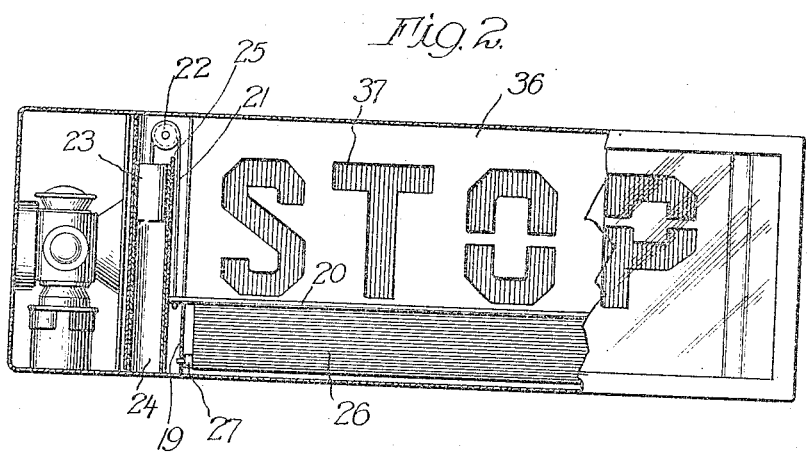
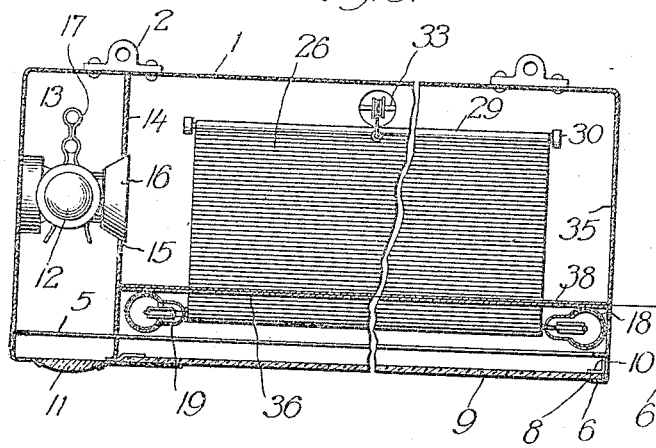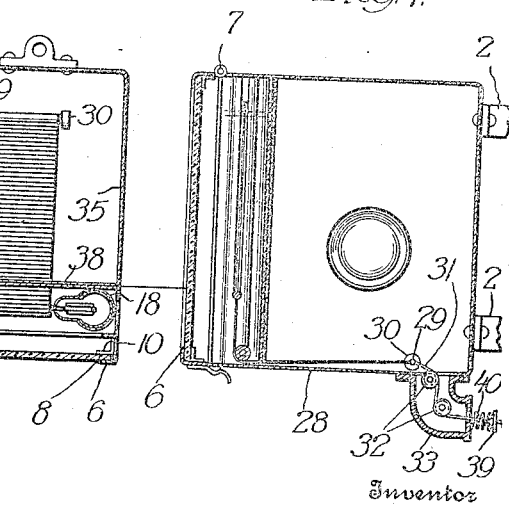
Witnesses
E. K. Barrett
K. K. Butler
Inventor
Garrett Burgess
By Rashel & Rashel
Attorneys

UNITED STATES PATENT OFFICE.

GARRETT BURGESS, OF DETROIT, MICHIGAN.

SIGNAL FOR AUTOMOBILES.

1,134,104.

Specification of Letters Patent. Patented Apr. 6, 1915.

Application filed September 28, 1914. Serial No. 863,831.

*To all whom it may concern:*

Be it known that I, GARRETT BURGESS, a citizen of the United States of America, residing at Detroit, in the county of Wayne and State of Michigan, have invented certain new and useful Improvements in Signals for Automobiles, of which the following is a specification, reference being had therein to the accompanying drawings.

This invention relates to a signal for automobiles, and more particularly to that type adapted to be operated in synchronism with a brake lever, clutch pedal or other instrumentality manipulated to stop or retard the progress of an automobile or similar vehicle, whereby a "stop" or visible danger signal will be displayed to reduce to a minimum rear-on collisions.

The primary object of my invention is to provide a signal of the above type that can be used by day or night to instantly display a sign visible to the operator of a following vehicle, to indicate an interruption in traffic necessitating precaution, especially upon congested streets.

The operation of the signal is automatic and simply requires attention at night in order to illuminate the sign. This can be accomplished by using a suitable lamp and for the purposes of my invention, I prefer to use a lamp that will serve as a tail light for an automobile, and at the same time be detachable whereby repairs and inspection are possible at night.

A further object of this invention is to provide a strong, durable and inexpensive signal of the above type that is applicable to various types of vehicles, the signal being constructed with a view to its installation upon low grade and cheap automobiles.

With the above and other objects in view the invention resides in the novel construction, combination and arrangement of parts to be hereinafter specifically described and then claimed.

Reference will now be had to the drawing, wherein—

Figure 1 is a side elevation of a portion of a vehicle illustrating one manner of operating a signal in accordance with this invention; Fig. 2 is a vertical, longitudinal sectional view of the signal; Fig. 3 is a horizontal sectional view of the same partly broken away; and Fig. 4 is a cross sectional view of the signal.

A signal in accordance with this invention comprises a rectangular casing preferably made of metal finished to harmonize with other metallic fittings of an automobile or vehicle body. The rear wall 1 of the casing has socket members 2 to accommodate brackets 3, carried by an automobile body 4. Any other suitable fastening means can be employed for holding the casing in a visible position at the rear end of the automobile body.

The front wall of the casing has a large oblong opening 5 and normally closing said opening is a door or lid 6 hinged or pivotally connected, at at 7 to the top of the casing. The door 6, for the greater part of its length, has an opening 8 closed by a transparent plate 9, which is retained at the inner side of the door by brackets 10 or other fastening means. Contiguous to an end of the door 6 is a bull's eye or lens 11 transversely alining with a lamp 12 detachably mounted in a compartment 13 provided therefor and formed by a transverse partition 14 mounted in the casing. The partition 14 has an opening 15 to receive the reflector 16 of the lamp and said lamp is detachably held by clamps or a suitable holdfast device 17, whereby the lamp can be removed from the casing and used for other purposes.

Within the casing, adjacent to the front wall thereof are vertically disposed tubular guides 18 provided with longitudinal offset portions 19 slotted for the greater part of their length to receive the ends of a curtain rod 20. The ends of the curtain rod 20 are connected to cables 21 within the offset portions 19 and said cables extend over revoluble sheaves or pulleys 22, located in the upper ends of the tubular guides 18, and are attached to weights 23 within the tubular guides. These guides are lined with rubber 24 or other yieldable material to prevent rattling of the weights within the revoluble guides, and in order that the revoluble sheaves or pulleys can be properly located, the walls of guides are cut away, as at 25 whereby the sheaves or pulleys will extend partly into the offset portions thereof.

Attached to the curtain rod 20 is a curtain or apron 26 that is trained under a roller 27 having the pintles thereof journaled in the lower ends of the offset portions 19 of the tubular guides 18. The curtain or apron 26 extends rearwardly in proximity to the bottom plate 28 of the casing and is attached to another curtain rod 29. This rod has the ends thereof provided with rollers or wheels 30 adapted to travel upon the bottom plate 28 of the casing when the curtain or apron is shifted.

The curtain rod 29, intermediate the ends thereof, is attached to a cable 31 trained over and under revoluble sheaves or pulleys 32 located in an elbow 33 attached to the bottom plate 28 of the casing. The cable 31 extends out of the elbow 33 and forwardly along the vehicle body 4 to a controlling instrumentality of the vehicle. For instance, in Fig. 1 there is diagrammatically illustrated a brake lever 34 and it is to the crank portion of this lever that the cable is connected, whereby an initial movement of the lever will shift the curtain or apron 26.

Mounted in the casing and connecting the partition 14 to the end wall 35 of the casing is a longitudinal partition 36, said partition extending in close proximity to the bottom plate 28 of the casing and providing sufficient clearance for the curtain or apron 26. The partition 36 is provided with openings 37 in the form of characters representing the word "stop", and arranged against said partition is a transparent plate 38, preferably red in color, whereby the word "stop" will appear in red characters particularly at night when illuminated by the lamp 12.

The curtain or apron 26 is retained normally elevated by the weights 23 within the tubular guides, and when the brake lever 34 is manipulated to set the brakes of the vehicle the curtain rod 29 is pulled upon by the cable 31, lowering the curtain or apron 26, and displaying the word "stop". When the brake lever 34 is released, the weights 23 immediately restore the curtain or apron to a raised position.

To prevent injury to the curtain or apron 26 by a sudden elevation of the same, the cable 31 is provided with a stop 39 adapted to impinge a coiled compression spring 40 at the elbow 33, said spring cushioning the stop 39 and preventing the curtain rod 20 from striking the top of the casing or the weights 23 the bottom thereof.

It is thought that the operation and utility of the signal will be apparent without further description, and while in the drawing there is illustrated a preferred embodiment of the invention, it is to be understood that the structural elements are susceptible to such changes, as in the size, shape, and manner of assemblage as fall within the scope of the appended claims.

What I claim is:—

1. In a signal for automobiles, a casing adapted to have the interior thereof illuminated, a partition within said casing having openings formed therein representing characters, tubular guides within said casing, a curtain movable in front of said partition, weights within said guides for holding said curtain normally raised so as to conceal the characters, and means extending into said casing adapted to facilitate lowering said curtain.

2. In a signal for automobiles, a casing adapted to have the interior thereof illuminated, a partition in said casing provided with openings representing characters, vertical guides in said casing, a curtain movable under said partition between said guides and in front of said partition, weights in said guides adapted to hold said curtain normally raised so as to conceal the characters, and means extending into the bottom of said casing adapted to facilitate lowering said curtain to display the characters of said partition.

3. In a signal for automobiles, a casing, a partition therein provided with openings representing characters, vertically disposed tubular guides in said casing, a curtain movable in front of said partition and between said guides, means within said guides for holding said curtain normally raised so as to conceal said characters, means extending into said casing adapted to facilitate lowering said curtain.

In testimony whereof I affix my signature in presence of two witnesses.

GARRETT BURGESS.

Witnesses:
ANNA M. DORR,
KARL H. BUTLER.